(12) United States Patent
Murphy et al.

(10) Patent No.: US 6,538,780 B1
(45) Date of Patent: Mar. 25, 2003

(54) APPARATUS AND METHOD FOR REDUCING THE NUMBER OF CONTROL ELEMENTS FOR CROSSTALK REDUCTION DEVICES IN AN OPTICAL SWITCHING NETWORK

(75) Inventors: Timothy Owen Murphy, Fairport, NY (US); Gaylord Warner Richards, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/439,016

(22) Filed: Nov. 12, 1999

(51) Int. Cl.⁷ .............................. H04K 3/00; H04J 14/00
(52) U.S. Cl. ........................................ 359/111; 359/117
(58) Field of Search .......................... 370/201; 359/117, 359/128, 139, 118, 165, 111

(56) References Cited

FOREIGN PATENT DOCUMENTS

| JP | 61-194408 A | * | 8/1986 | .................. 385/17 |
| JP | 63-50193 A | * | 3/1988 | .................. 379/259 |

* cited by examiner

*Primary Examiner*—Leslie Pascal
*Assistant Examiner*—Christina Y. Leung

(57) ABSTRACT

An apparatus and method for reducing the number of control elements for crosstalk reduction devices in an optical switching network is disclosed. Crosstalk reduction devices are partitioned into two mutually exclusive groups based on a binary address of the crosstalk reduction device. By successively changing the bits within the destination address of the active signal path within the network, two mutually exclusive groups of crosstalk reduction devices is generated and one control signal is sufficient to operate the devices. The apparatus of the invention comprises a switching module having input channels and output channels, the switching network arranged in a tree topology comprising a first plurality of switching elements adapted to fan-out, said first plurality of switching elements coupled to said input channels; a plurality of crosstalk reduction devices coupled to said first plurality of switching elements, said crosstalk reduction device operable in a passing state and a blocking state; a second plurality of switching elements adapted to fan-in to said output channels, said second plurality of switching elements coupled to said crosstalk reduction devices; and a control signal coupled to each of said plurality of crosstalk reduction devices, said control signal adapted to selectively enable the passing state and the blocking state of said crosstalk reduction device.

30 Claims, 7 Drawing Sheets

APPARATUS AND METHOD FOR REDUCING THE NUMBER OF CONTROL ELEMENTS FOR CROSSTALK REDUCTION DEVICES IN AN OPTICAL SWITCHING NETWORK

FIELD OF THE INVENTION

The present invention relates generally to optical switching networks and more particularly to an apparatus and method for reducing the number of control elements for crosstalk reduction devices in an optical switching network.

BACKGROUND OF THE INVENTION

This invention was made with Government support under Agreement No. MDA972-95-3-0027 awarded by ARPA. The Government has certain rights in the invention.

Optical communication systems use optical signals to convey information over an optical transmission medium, typically a waveguiding medium such as optical fiber. The usable transmission capacity of a given waveguiding medium can be substantially increased by the use of wavelength division multiplexing (WDM) techniques. WDM is a method for increasing the capacity of an optical transmission system by simultaneously operating a plurality of optical signals at different wavelengths over one medium and can be used for both long-haul transmission systems and small local area networks. With WDM, different multiplexed optical signals can be transmitted at different wavelengths, referred to as channel wavelengths, through the same transmission medium.

The extensive use of WDM techniques necessitates the use of speedy interconnected elements such as optical switching modules. The switching modules, typically made using lithium niobate (LiNbO$_3$), a ferroelectric material, are necessary for the effective routing and control of optical signals from many different paths. However, as the number of interconnected elements and waveguides increase, crosstalk among signals in the waveguides and optical interconnectors is increasingly a problem.

Generally in an optical network, light beams are modulated in a digital or analog fashion and are used as optical carriers of information. There are many reasons why light beams or optical carriers are preferred in these applications. For example, as the data rate required of such channels increases, the high optical frequencies provide a tremendous improvement in available bandwidth over conventional electrical channels such as formed by wires or coaxial cables. In addition, the energy required to drive and carry high bandwidth signals can be reduced at optical frequencies. Further, optical channels can be packed closely and even intersect in space.

Although optical switches have improved dramatically in the last few years, they do not function as perfect digital switches. That is, there is a certain amount of leakage inherently associated with the waveguide structure of the switch. For example, in a typical 1×2 switch with one input port routed to one of two output ports, there may be some signal leakage of the active signal at the undesired output port which is characterized as crosstalk.

In one example of an optical switching network, arbitrary connections between N input channels to any of M output channels can be accomplished by a tree architecture. Although denoted "channels," the channels may refer to processors in a multiprocessor environment or fiber optic channels or the like. If desired, any electronic information at the input channels can be modulated on optical carriers and reconverted to electronic information at the output channels to emulate any electronic network. Optionally, modulation in the optical domain can be maintained to provide a ready interface to other optical interconnect schemes.

Referring to FIG. 1, there is shown, for illustration purposes, a 12×6 tree architecture 10 coupling twelve input channels 65 with six output channels 75. A 1×6 fan-out tree 15 is formed for each of the twelve input channels and a 12×1 fan-in tree 20 is formed for each of the six output channels. As can be seen, each stage of the fan-out tree 15 is assembled with active 1×2 switches 35. Similarly, each stage of the fan-in tree 20 is assembled with 2×1 switches 45. Each 1×2 switch is composed of one input port and two output ports and each 2×1 switch is composed of two input ports and one output port. The fan-out tree 15 is composed of successive stages of 1×2 switches which act as demultiplexers for each input channel. It should be apparent that a unique path for each of the 12×6 possible connections between the input channels and output channels exists in the network of FIG. 1. Control signals (not shown) are also coupled to each stage of active switches to control the output of the 1×2 switches and 2×1 switches. Typically, to minimize the real estate taken up by control signals, a "ganged" approach is used to control each stage of switches. That is, all switches in the same stage of a given tree are switched by the same control signal. As will be described in detail below, the intersection of the fan-out tree and the fan-in tree is an advantageous location for the placement of crosstalk reduction devices 55 since the intersection serves as a possible opportunity for any crosstalk signals to combine with active signal paths.

Generally, an N×M network arranged in a tree architecture exhibits [Log$_X$ N]+[Log$_X$ M] stages wherein X represents the number of output ports on each switch (2 in our example) within the topology and wherein the expression [Y] represents an integer greater than or equal to the argument Y. For instance, a 12×6 tree architecture comprised of 1×2 and 2×1 switches exhibits [Log$_2$ 12]+[Log$_2$ 6] stages, for a total of 7 stages. Additionally, there are generally N·M interconnection sites between the respective N 1×M fan-out trees and the respective M N×1 fan-in trees for insertion of crosstalk reduction devices. In the 12×6 tree architecture of FIG. 1, there are 72 crosstalk reduction devices 55. Conventionally, for the N·M crosstalk reduction devices, N·M control voltage signals are necessary to individually control the crosstalk reduction devices. In the example of a 12×6 tree architecture, 72 individual control voltage signals are necessary to control the crosstalk reduction devices.

Referring to FIG. 2, an illustration of crosstalk propagation that can result from a "ganged" approach to controlling a stage of switches is described using an exemplary embodiment of a 1×32 fan-out tree. The nodes on the figure are schematic representations of 1×2 switches in a given 1×32 fan-out tree 15 for a specific input channel. At each switch, the active signal is routed to the desired output port. However, a "knocked down" version of the active signal is transmitted to the other output port because of leakage and is termed level 1 crosstalk. As this crosstalk propagates to the second stage of switches, the crosstalk is "knocked down" another level. That is, any leakage at a succeeding stage weakens the initial crosstalk signal. Referring again to FIG. 2, the double arrowed path shows the desired output of the fan-out tree 15 from one input channel denoting the active signal path. The single arrowed path shows the path of any level 1 crosstalk. At node 101, the active signal is routed to one of the output ports (arbitrarily shown in the Figure as an upward path and denoted by double arrows). At node 102, the knocked down crosstalk signal appears as level 1 crosstalk (shown in the Figure as a downward path and denoted by single arrows). However, because of the ganged approach to control signals at each stage, level 1 crosstalk is propagated to node 103. Similarly, nodes 104, 105 and 106 experience level 1 crosstalk because of the ganged approach to control signals. In contrast to the propagation of level 1 crosstalk, at the unintended output port at node 102, the level 1 crosstalk is "knocked down" a level to produce level 2 crosstalk at node 107. It should be apparent that nodes 111, 121, 131, 141 and 106 will have level 1 crosstalk appearing at the output of the fan-out tree 15 for a particular set of control signals for a particular active signal. Node 151 will have the active signal appearing at the node. All other nodes will have either a level 2 or a higher level crosstalk appearing at the node. Any other crosstalk (i.e. level 2 crosstalk, level 3 crosstalk, etc.) is acceptable since the crosstalk signals are sufficiently weakened by being knocked down at more than one switch.

With the proper placement and control of crosstalk reduction devices at the intersection of the fan-out tree and the fan-in tree, the level 1 crosstalk may be blocked while the active signal is allowed to pass. Crosstalk reduction devices have only two states, either passing the optical signal or blocking the optical signal based on a control signal. It should be apparent that in the implementation of FIG. 1, a total of 72 (12·6) crosstalk reduction devices are required. Generally, a total of N·M crosstalk reduction devices are required, each with its own control signal. For any large implementation of a tree architecture network (for example, 16×16), the number of control voltage signals for the crosstalk reduction devices can impose significant burdens on chip real estate and unduly complicate wiring.

Accordingly, there is a need for minimizing the number of control elements for crosstalk reduction devices at the intersection of the fan-out trees and the fan-in trees.

SUMMARY OF THE INVENTION

The invention is an apparatus and method for reducing the number of control signals for crosstalk reduction devices. Prior art implementations relying upon localized crosstalk reduction have generally required N·M control signals. In the present invention, the number of control signals necessary for the control of crosstalk reduction devices is significantly reduced compared to the prior art and will be shown to be the smaller of N or M (for an arbitrary N×M switching module).

The invention relates to the number of control elements for crosstalk reduction devices at the intersection of the fan-out trees and the fan-in trees for a tree architecture. The crosstalk reduction devices are partitioned into two mutually exclusive groups based on the levels of crosstalk propagated to the outputs of the fan-out tree. A pattern of crosstalk propagation is derived by assigning binary destination addresses to each switch within the fan-out trees. By successively changing the bits within the destination address of the active signal, two mutually exclusive groups of crosstalk reduction devices result. Therefore, for each input channel of the switching module, one control voltage signal is sufficient to control the operation of the crosstalk reduction devices. A similar approach can be taken for each output channel indicating that one control signal is sufficient for the proper operation of the crosstalk reduction devices associated with that output channel. Therefore, for an N×M tree architecture, the number of control signals required for the operation of the crosstalk reduction devices is the lesser of N or M.

BRIEF DESCRIPTION OF THE DRAWINGS

A more complete understanding of the present invention may be obtained by considering the following description in conjunction with the drawings in which.

DETAILED DESCRIPTION

Figure 1:
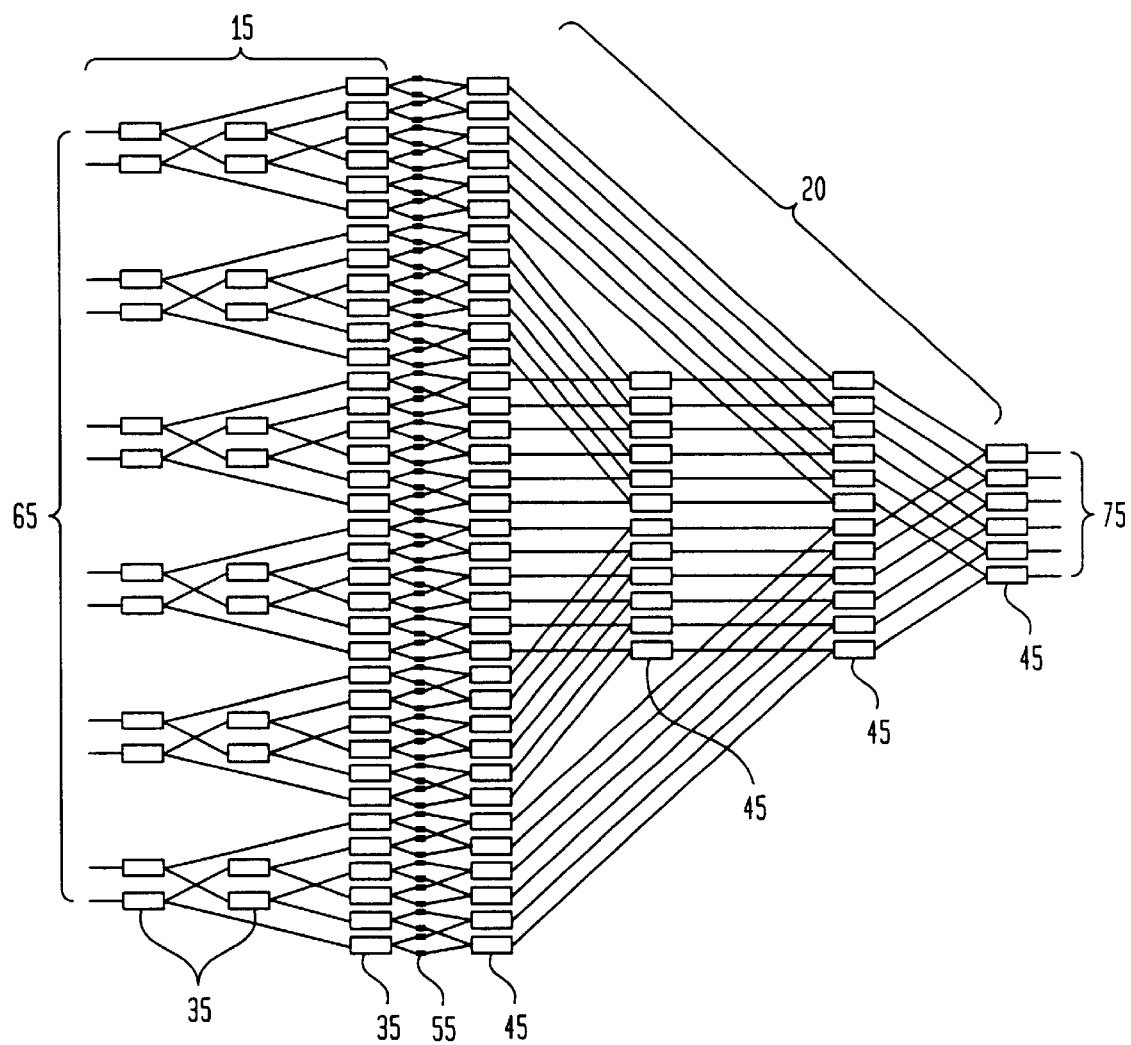
FIG. 1 is a schematic diagram of a 12×6 network with a tree architecture consisting of fan-out trees coupled to fan-in trees.
Figure 3:
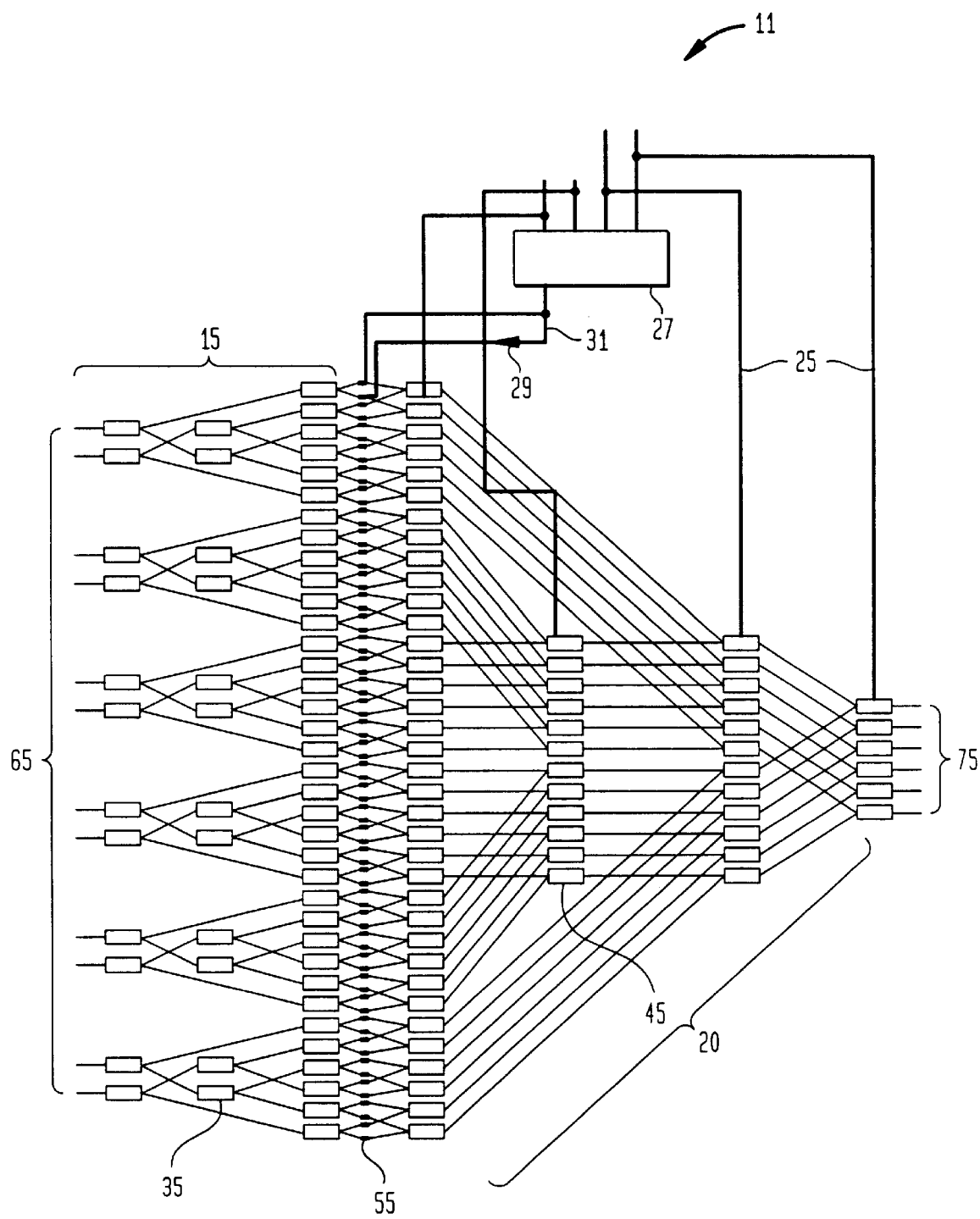
FIG. 3 is a schematic diagram of an exemplary embodiment of a 12×6 network with a tree architecture in accordance with the principles of the invention.

Referring to FIG. 3, there is shown a schematic diagram of a 12×6 tree architecture 11 in accordance with the principles of the present invention. Similar to FIG. 1, a 1×6 fan-out tree 15 is formed for each of the twelve input channels and a 12×1 fan-in tree 20 is formed for each of the output channels. Control signals 25 to "gang" control each stage of the fan-in tree are shown coupled to 2×1 switches 45 on the fan-in tree. Control signals 25 are further coupled to a decoder 27 which generates a control signal 31 for the proper control of the crosstalk reduction devices 55. It should be noted that for the sake of simplicity, a single decoder corresponding to the control of crosstalk reduction devices for a single output channel is illustrated in FIG. 3. Inverter 29 generates an inverted version of control signal 31. A grouping of crosstalk reduction devices 55 is controlled by control signal 31 and another grouping of crosstalk reduction devices 55 is controlled by the inverted version of control signal 31. It should be noted that the implementation illustrated in FIG. 3 is specific to one input channel or output channel. For an arbitrary N×M switching module, the number of control signals necessary will be shown to be the smaller of N or M. Generation of the groupings is described in detail below.

The following description will describe the invention with reference to a 1×32 optical tree architecture utilizing 1×2 switches and 2×1 switches. It should be noted that the following description is illustrative only and is not intended to be limited solely to such a specific embodiment.

As noted in the Background, arbitrary connections between N input channels and M output channels can be accomplished by a tree architecture. Referring back to FIG. 1, there is shown a 12×6 tree architecture composed of 1×2 switches and 2×1 of optical switches. Each input channel has a 1×6 fan-out tree arranged as successive stages of 1×2 switches. Each output channel has a 12×1 fan-in tree arranged as successive stages of 2×1 switches. The 6 "leaves" of each fan-out tree are individually coupled to a different "leaf" on each of the 12×1 fan-in trees. A total of 72 (12·6) crosstalk reduction devices are arranged at the intersections of the fan-in trees and the fan-out trees. Additionally, a ganged approach to controlling the switches in each stage of a given topology is used by control signals (not shown) coupled to each individual 1×2 and 2×1 switch.

Figure 2:
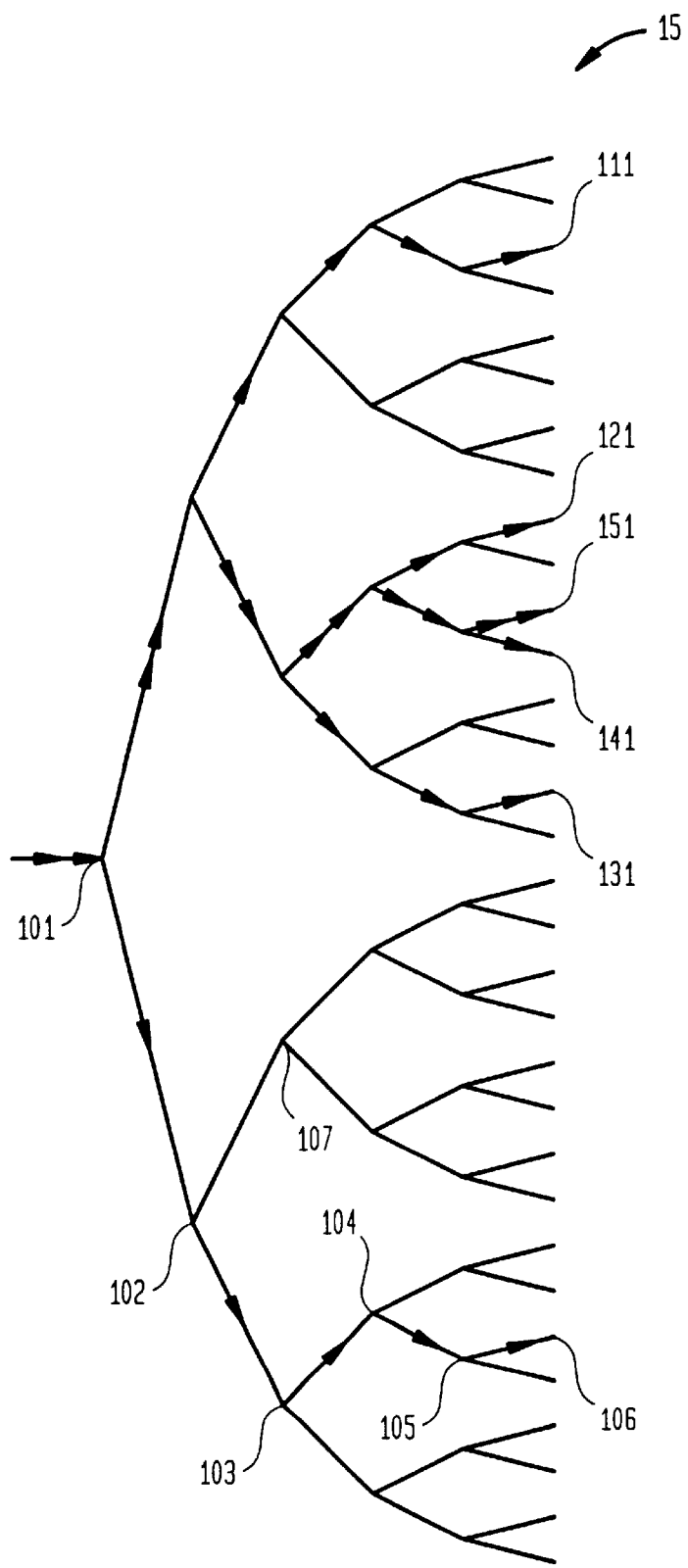
FIG. 2 is a schematic diagram of crosstalk propagation in a 1×32 fan-out tree illustrating levels of crosstalk propagation along the fan-out tree.
Figure 4:
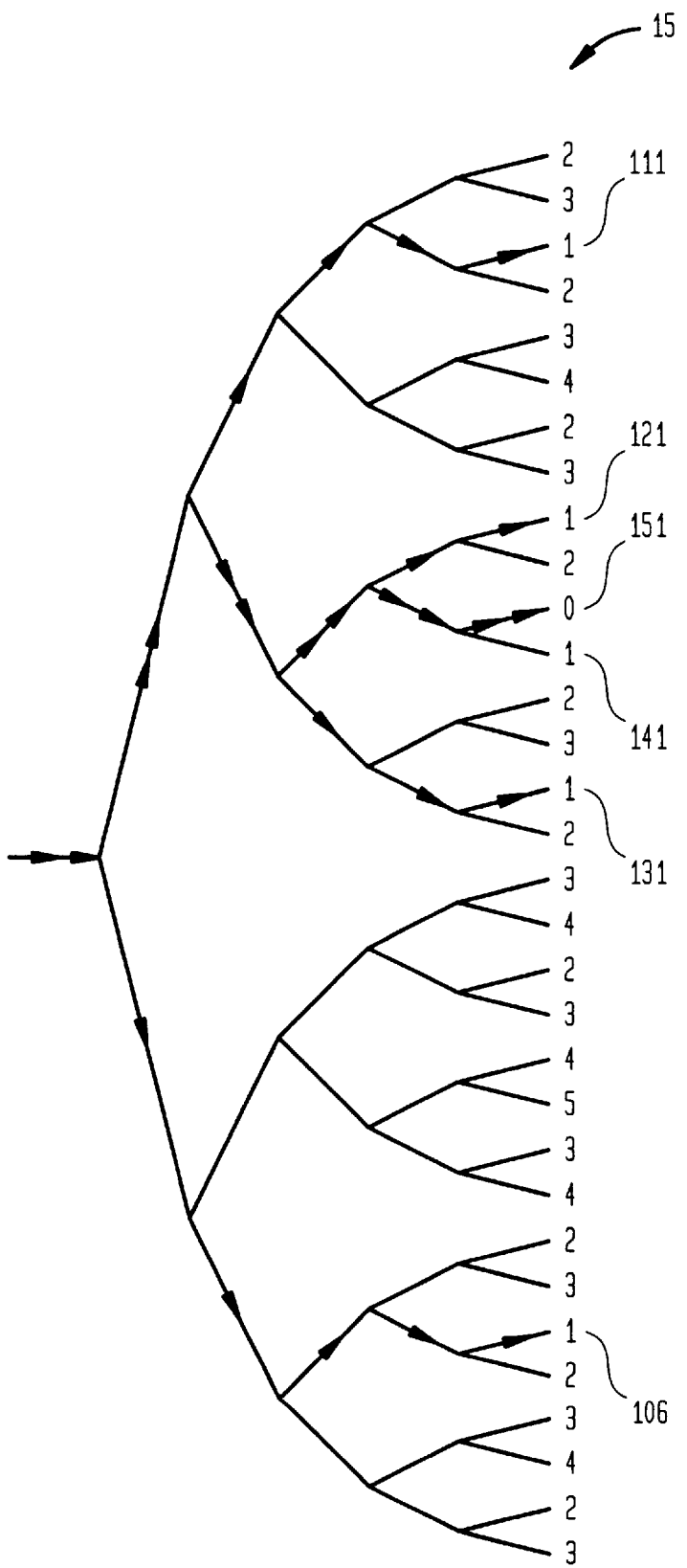
FIG. 4 is a schematic diagram of crosstalk propagation in the 1×32 fan-out tree illustrating the levels of crosstalk at the outputs of the tree.

In order to control the crosstalk reduction devices of a given tree with a single control voltage signal, the crosstalk reduction devices must be partitionable into two distinct and separate groups. The groups must be mutually exclusive, that is, when the crosstalk reduction devices of one group are in the block state of operation, the crosstalk reduction devices of the other group must be in the pass state of operation and vice versa. With such an arrangement, only one control voltage signal is necessary. Referring to FIG. 4, there is shown a schematic diagram of crosstalk propagation in a 1×32 fan-out tree architecture for a particular input channel illustrating the possible state of the crosstalk reduction devices at the outputs of the fan-out tree. The numerals next to each output node of the fan-out tree represents the level of crosstalk signal appearing at the output node. For instance, nodes 111, 121, 131, 141 and 106 exhibit level 1 crosstalk. Node 151 exhibits the active signal. All other nodes exhibit crosstalk at levels of two or higher. Utilizing the same active signal path illustrated in FIG. 2, it can be seen that the five outputs of the fan-out tree with level 1 crosstalk must be blocked while the active signal path must be allowed to pass. The other outputs of the fan-out tree illustrate additionally "knocked down" crosstalk signals which can be passed or blocked.

Figure 5:
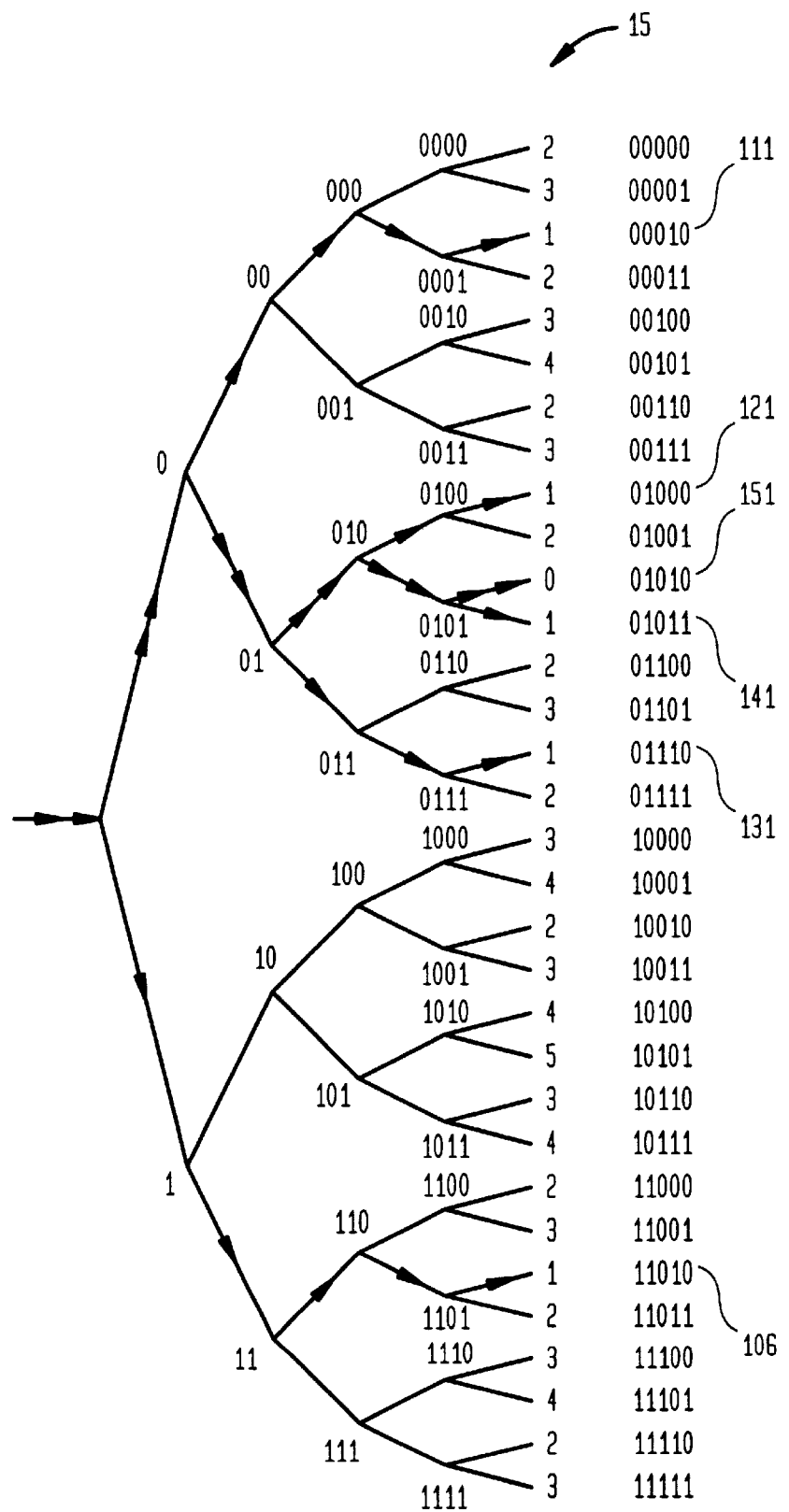
FIG. 5 is a schematic diagram of crosstalk propagation in the 1×32 fan-out tree illustrating the levels of crosstalk at the outputs of the tree along with binary labels of these outputs.

Referring to FIG. 5, there is shown a schematic diagram of crosstalk propagation in a 1×32 fan-out tree architecture for a particular input channel. By assigning binary destination addresses for each node in FIG. 5, a pattern can be seen. For example, an arbitrary decision to assign a logic zero for an up route for the active signal path on the schematic tree and a logic one for a down route for the active signal path on the schematic tree results in a set of binary "addresses" for each node on the Figure. Using the active signal path example illustrated in FIGS. 2 and 4 and assigning binary addresses to the nodes of FIG. 5 (for example, assigning the binary address of 00000 to the uppermost leaf and assigning a binary address of 11111 to the bottommost leaf), it can be seen that the active signal output port address differ in exactly one bit position from each of the output port addresses which must be blocked for level 1 crosstalk. That is, by successively changing exactly one bit position in the binary address of the active signal output port, the binary addresses of the level 1 crosstalk output ports can be derived. For example, using the active signal path example of FIGS. 2 and 4, the binary address of the active signal output port is 01010. By successively changing each bit position of the address 01010, five different binary addresses can be generated (11010, 00010, 01110, 01000 and 01011) which correspond to the level 1 crosstalk output ports at which crosstalk must be blocked. Therefore, the binary addresses of the level 1 crosstalk output ports may be readily derived from the active signal output port.

It is readily apparent that binary addresses of the level 1 crosstalk output ports (in the above example, 11010, 00010, 01110, 01000 and 01011) and the binary address of the active signal path are in mutually exclusive groups. The grouping is defined by changing one bit in any binary address. Therefore, addresses in the same group differ in an even number of bit positions (0, 2 or 4 in the current example) and addresses in different groups differ in an odd number of bit positions (1, 3 or 5 in the current example). Therefore, one group contains binary addresses with an even number of 0's and the other group contains binary addresses with an odd number of 0's.

Figure 6:
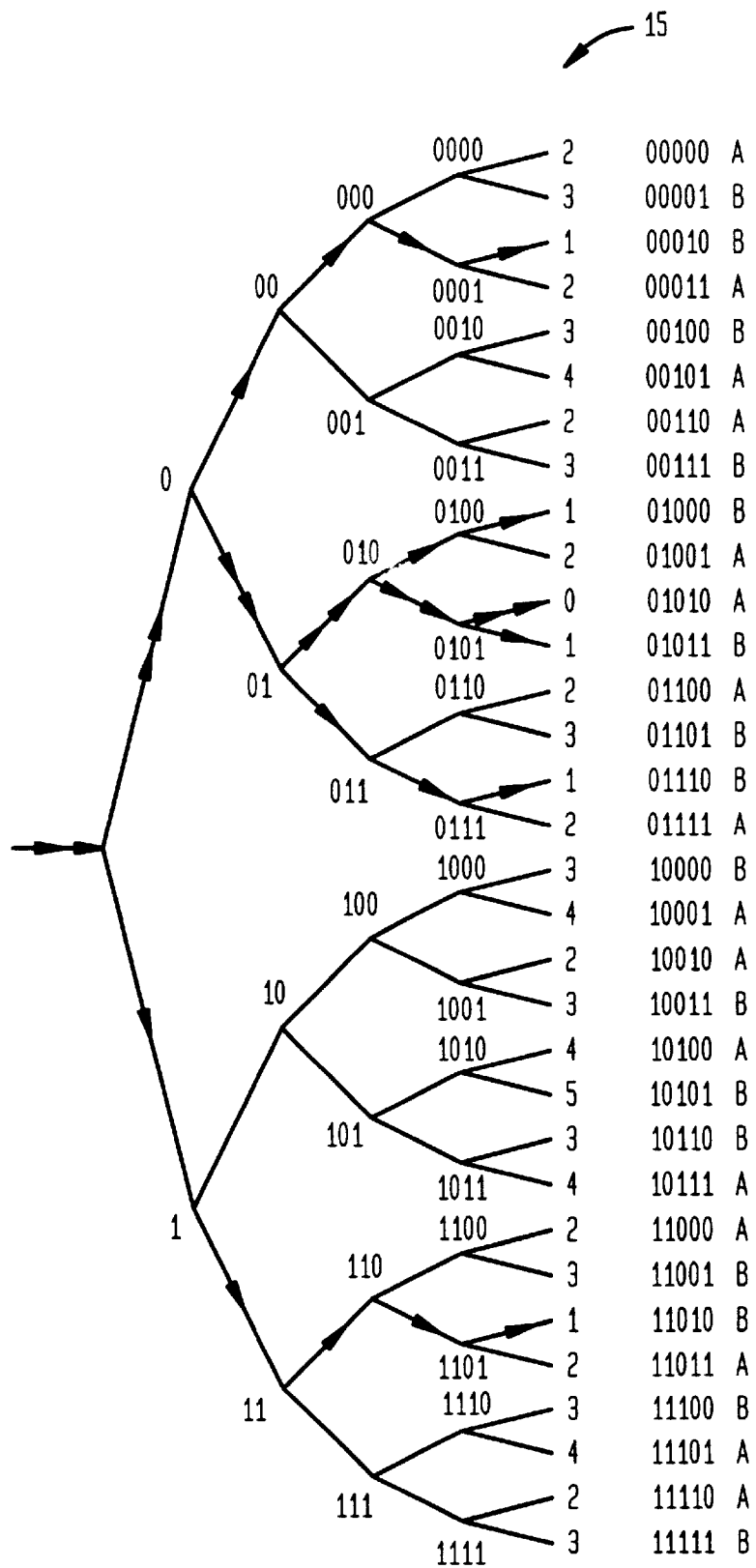
FIG. 6 is a schematic diagram of crosstalk propagation in the 1×32 fan-out tree illustrating the grouping of crosstalk reduction devices.

Referring to FIG. 6, there is shown a grouping of output ports of the 1×32 fan-out tree arranged into two mutually exclusive groups. "A" denotes nodes assigned to one group while "B" denotes nodes assigned to the other group. Since the groups are mutually exclusive, when the crosstalk reduction devices assigned to one group are in the pass state, the crosstalk reduction devices assigned to the other group are in the blocked state (or vice versa). Therefore, a single voltage control can simultaneously pass any active signal path while blocking all occurrences of associated level 1 crosstalk. In the above example one signal is sufficient to properly control all of the crosstalk reduction devices for each input channel. Therefore, for the exemplary embodiment of a 12×6 tree architecture (refer back to FIG. 1), twelve control signals are sufficient to properly control each of the crosstalk reduction devices. In contrast, the conventional implementation requires 72 control voltage signals. Generally for an N×M network arranged in a tree architecture, it can be shown that the number of signals sufficient to control the crosstalk reduction devices is the lesser of N or M.

Figure 7:
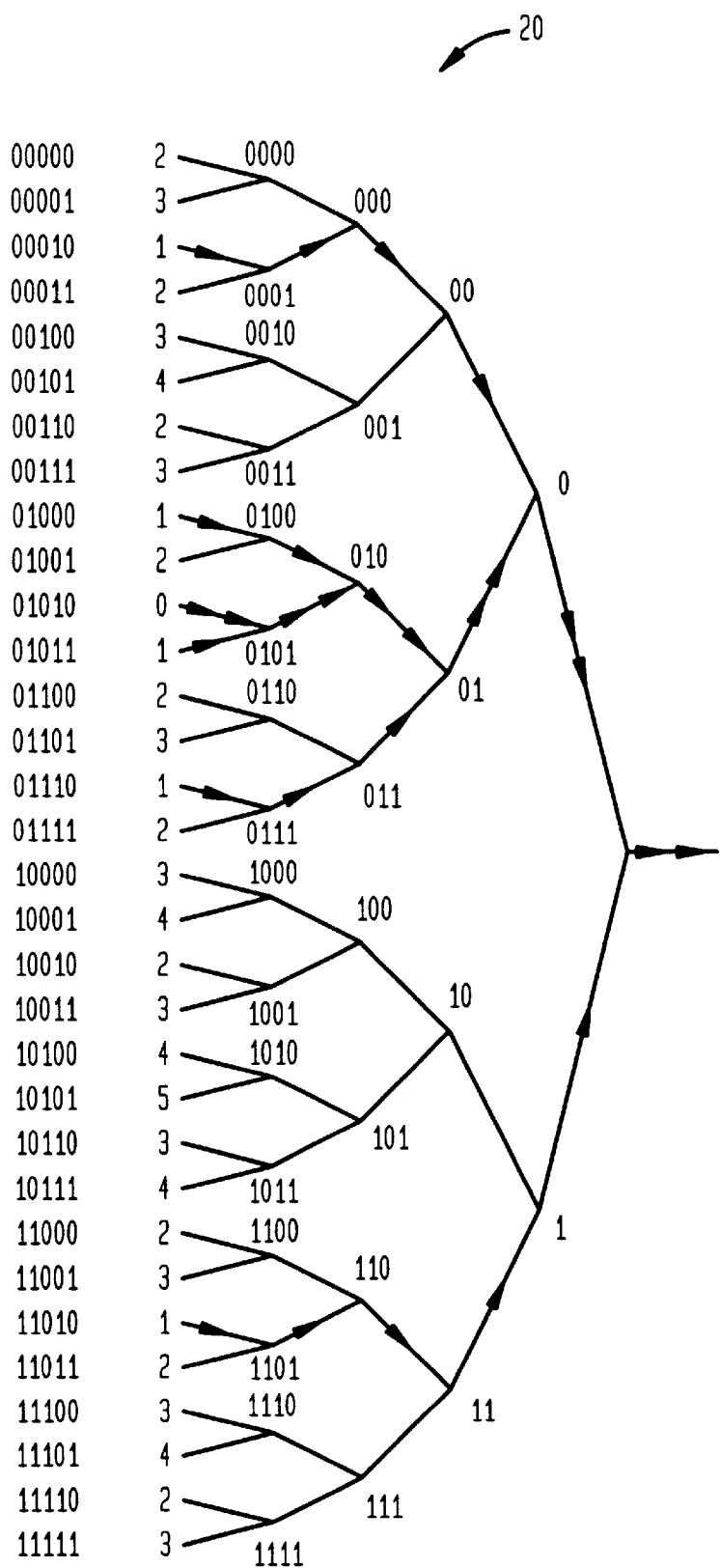
FIG. 7 is a schematic diagram of crosstalk propagation in a 32×1 fan-in tree illustrating the grouping of crosstalk reduction devices from the perspective of a single output channel.

Referring to FIG. 7, there is shown a schematic diagram of organizing the crosstalk reduction devices from the perspective of a particular output channel in a 32×1 fan-in tree. Similar to the analysis for the input channel (or fan-out tree), the objective is to reduce level 1 crosstalk entering at the input ports to the fan-in tree to level 2 or less at the output channel. It can be shown that only those input addresses which differ in one bit position from the active signal input address can reach a routed signal device without being further knocked down. Thus, by blocking crosstalk at all fan-in tree addresses which differ in one bit positions from the active signal input, no level 1 crosstalk will reach the output channel. Therefore, a single voltage control signal is sufficient to control the crosstalk reduction device for each output channel. Thus, the number of signals necessary to control the crosstalk reduction devices is the lesser of N or M.

It will be understood by those skilled in this technology that modifications are possible without departing from the scope and spirit of the present invention. For instance, the methodology demonstrated above can be adapted for any tree topology network to reduce the number of control voltage signals. For example, the methodology is also adaptable for any N and M in any switch utilizing fan-out and fan-in trees which are constructed with 1×2 and 2×1 switches respectively.

Although the present invention is described in various illustrative embodiments, it is not intended to limit the invention to precise embodiments disclosed herein. Accordingly, this description is to be construed as illustrative only. Those who are skilled in this technology can make various alterations and modifications without departing from the scope and spirit of this invention. Therefore, the scope of the present invention shall be defined and protected by the following claims and their equivalents. The exclusive use of all modifications within the scope of the claims is reserved.

What is claimed is:

1. In a switching module with N input channels, each input channel coupled to a plurality of crosstalk reduction devices each operable in a pass state and a block state, a method for reducing the number of control elements for crosstalk reduction, said method comprising the steps of:

partitioning said crosstalk reduction devices into two groups;

generating a control signal according to said partition;

operating one of said two groups of crosstalk reduction devices in the pass state according to the control signal;

operating the other of said two groups of crosstalk reduction devices in the block state according to the control signal.

2. The method of claim 1 wherein said switching module is an optical switching module.

3. The method of claim 1 wherein said step of generating a control signal is repeated for each input channel.

4. The method of claim 1 wherein said fan-out tree comprises switch elements.

5. The method of claim 3 wherein said switch elements are optical switches.

6. The method of claim 1 wherein said fan-in tree comprises switch elements.

7. The method of claim 6 wherein said switch elements are optical switches.

8. The method of claim 1 wherein said switching module is a tree architecture and wherein said crosstalk reduction devices are coupled between a fan-out tree and a fan-in tree.

9. In a switching module with M output channels, each output channel coupled to a plurality of crosstalk reduction devices each operable in a pass state and a block state, a method for reducing the number of control elements for crosstalk reduction, said method comprising the steps of:

partitioning said crosstalk reduction devices into two groups;

generating a control signal according to said partition;

operating one of said two groups of crosstalk reduction devices in the pass state according to the control signal;

operating the other of said two groups of crosstalk reduction devices in the block state according to the control signal.

10. The method of claim 9 wherein said switching module is an optical switching module.

11. The method of claim 9 wherein said step of generating a control signal is repeated for each output channel.

12. The method of claim 9 wherein said fan-out tree comprises switch elements.

13. The method of claim 12 wherein said switch elements are optical switches.

14. The method of claim 9 wherein said fan-in tree comprises switch elements.

15. The method of claim 14 wherein said switch elements are optical switches.

16. The method of claim 9 wherein said switching module is a tree architecture and wherein said crosstalk reduction devices are coupled between a fan-out tree and a fan-in tree.

17. A method of reducing the number of control elements for reducing crosstalk in an optical network comprising a plurality of successively interconnected stages with nodes, each node operable in a pass state or a block state, said method comprising the steps of:

determining a binary address of each node;

generating a control signal in response to the binary address of said node;

switching one of said two groups of nodes to the pass state according to the control signal; and switching other of said two groups of nodes to the block state according to the control signal.

18. The method according to claim 17 wherein said optical network is a tree architecture network.

19. The method according to claim 18 wherein said nodes are optical switches.

20. The method according to claim 17 wherein said nodes are crosstalk reduction devices.

21. An apparatus for reducing the number of control elements for crosstalk reduction in a switching module having input channels and output channels, the switching module arranged in a tree topology, the apparatus comprising:

a first plurality of switching elements adapted to fan-out, said first plurality of switching elements coupled to said input channels;

a plurality of crosstalk reduction devices coupled to said first plurality of switching elements, said crosstalk reduction device operable in a passing state and a blocking state;

a second plurality of switching elements adapted to fan-in to said output channels, said second plurality of switching elements coupled to said crosstalk reduction devices; and a control signal coupled to each of said plurality of crosstalk reduction devices, said control signal adapted to selectively enable the passing state and the blocking state of one or more of said crosstalk reduction devices;

wherein said switching module has N input channels and M output channels;

wherein said first plurality of switching elements are adapted to fan-out to N 1×M trees;

wherein said second plurality of switching elements are adapted to fan-in to M N×1 trees;

wherein said plurality of crosstalk reduction devices are coupled between said fan-out and said fan-in trees;

wherein the number of crosstalk reduction devices is N·M; and wherein control of said plurality of crosstalk reduction devices is accomplished by N control signals.

22. The apparatus of claim 21 wherein said switching module is an optical switching module.

23. The apparatus of claim 21 wherein each of said first plurality of switching elements are 1×2 switches.

24. The apparatus of claim 23 wherein each of said second plurality of switching elements are 2×1 switches.

25. The apparatus of claim 21 wherein said first plurality of switching elements further comprises output ports for coupling to one of said plurality of crosstalk reduction devices, each of said crosstalk reduction devices assigned an individual binary address; and wherein said control signal for each crosstalk reduction device is generated by the binary address of said each crosstalk reduction device.

26. An apparatus for reducing the number of control elements for crosstalk reduction in a switching module having input channels and output channels, the switching module arranged in a tree topology, the apparatus comprising:

a first plurality of switching elements adapted to fan-out, said first plurality of switching elements coupled to said input channels;

a plurality of crosstalk reduction devices coupled to said first plurality of switching elements, said crosstalk reduction device operable in a passing state and a blocking state;

a second plurality of switching elements adapted to fan-in to said output channels, said second plurality of switching elements coupled to said crosstalk reduction devices; and a control signal coupled to each of said plurality of crosstalk reduction devices, said control signal adapted to selectively enable the passing state and the blocking state of one or more of said crosstalk reduction devices;

wherein said switching module has N input channels and M output channels;

wherein said first plurality of switching elements are adapted to fan-out to N 1×M trees;

wherein said second plurality of switching elements are adapted to fan-in to M N×1 trees;

wherein said plurality of crosstalk reduction devices are coupled between said fan-out and said fan-in trees;

wherein the number of crosstalk reduction devices is N·M; and wherein control of said plurality of crosstalk reduction devices is accomplished by M control signals.

27. The apparatus of claim 26 wherein said switching module is an optical switching module.

28. The apparatus of claim 26 wherein each of said first plurality of switching elements are 1×2 switches.

29. The apparatus of claim 28 wherein each of said second plurality of switching elements are 2×1 switches.

30. The apparatus of claim 26 wherein said first plurality of switching elements further comprises output ports for coupling to one of said plurality of crosstalk reduction devices, each of said crosstalk reduction devices assigned an individual binary address; and wherein said control signal for each crosstalk reduction device is generated by the binary address of said each crosstalk reduction device.

* * * * *